(12) United States Patent
Griffin

(10) Patent No.: US 9,390,516 B2
(45) Date of Patent: Jul. 12, 2016

(54) ASYNCHRONOUS STREAMING OF DATA FOR VALIDATION

(75) Inventor: Doug Griffin, Parker, CO (US)

(73) Assignee: TWO PIC MC LLC, Burbank, CA (US)

( * ) Notice: Subject to any disclaimer, the term of this patent is extended or adjusted under 35 U.S.C. 154(b) by 635 days.

(21) Appl. No.: 12/240,928

(22) Filed: Sep. 29, 2008

(65) Prior Publication Data

US 2010/0079466 A1  Apr. 1, 2010

(51) Int. Cl.
*G06T 15/70* (2006.01)
*H04N 7/18* (2006.01)
*G06T 7/20* (2006.01)
*G06K 9/00* (2006.01)
*G06F 3/01* (2006.01)

(52) U.S. Cl.
CPC .............. *G06T 7/2086* (2013.01); *G06F 3/011* (2013.01); *G06K 9/00335* (2013.01); *G06T 2200/08* (2013.01); *G06T 2207/10021* (2013.01); *G06T 2207/30201* (2013.01); *G06T 2207/30204* (2013.01)

(58) Field of Classification Search
CPC ......... G06T 13/40; G06T 13/00; G06T 13/80; G06T 13/20; A63F 13/10
USPC ................ 345/473; 382/118, 18; 348/77, 161
See application file for complete search history.

(56) References Cited

U.S. PATENT DOCUMENTS

| | | | |
|---|---|---|---|
| 4,797,736 A | 1/1989 | Kloots et al. | |
| 6,020,892 A | 2/2000 | Dillon | |
| 6,046,712 A * | 4/2000 | Beller et al. | 345/8 |
| 6,121,953 A | 9/2000 | Walker | |
| 6,578,967 B1 | 6/2003 | Paddock et al. | |
| 6,801,637 B2 * | 10/2004 | Voronka et al. | 382/103 |
| 7,218,320 B2 | 5/2007 | Gordon et al. | |
| 7,333,113 B2 | 2/2008 | Gordon | |
| 7,358,972 B2 | 4/2008 | Gordon et al. | |
| 7,388,971 B2 | 6/2008 | Rice et al. | |
| 7,401,920 B1 | 7/2008 | Kranz et al. | |
| 7,420,527 B2 * | 9/2008 | Sato et al. | 345/2.1 |
| 7,606,392 B2 * | 10/2009 | Gordon et al. | 382/103 |
| 7,791,608 B2 * | 9/2010 | Henson et al. | 345/474 |

(Continued)

OTHER PUBLICATIONS

International Search Report dated Nov. 20, 2009 for International Application No. PCT/US09/58824, filed Sep. 29, 2009.

(Continued)

*Primary Examiner* — Todd Buttram
(74) *Attorney, Agent, or Firm* — Kilpatrick Townsend & Stockton LLP

(57) ABSTRACT

The present invention relates to computer capture of object motion. More specifically, embodiments of the present invention relate to capturing of facial movement or performance of an actor. Embodiments of the present invention provide a head-mounted camera system that allows the movements of an actor's face to be captured separately from, but simultaneously with, the movements of the actor's body. In some embodiments of the present invention, a method of motion capture of an actor's performance is provided. A self-contained system is provided for recording the data, which is free of tethers or other hard-wiring, is remotely operated by a motion-capture team, without any intervention by the actor wearing the device. Embodiments of the present invention also provide a method of validating that usable data is being acquired and recorded by the remote system.

19 Claims, 12 Drawing Sheets

(56) References Cited

U.S. PATENT DOCUMENTS

| | | |
|---|---|---|
| 7,884,861 B2 * | 2/2011 | Vertoprakhov ............... 348/239 |
| 2005/0105772 A1 | 5/2005 | Voronka et al. |
| 2006/0055699 A1 * | 3/2006 | Perlman et al. ............... 345/473 |
| 2006/0071934 A1 | 4/2006 | Sagar et al. |
| 2006/0146142 A1 | 7/2006 | Arisawa et al. |
| 2007/0047768 A1 | 3/2007 | Gordon et al. |
| 2007/0058839 A1 | 3/2007 | Echegaray et al. |
| 2007/0214551 A1 | 9/2007 | Teetzei et al. |
| 2008/0025569 A1 | 1/2008 | Gordon et al. |
| 2008/0192114 A1 * | 8/2008 | Pearson et al. .................. 348/81 |
| 2008/0247672 A1 * | 10/2008 | Kaplinsky et al. ............ 382/300 |

OTHER PUBLICATIONS

International Search Report dated Nov. 20, 2009 for International Application No. PCT/US09/58820, filed Sep. 29, 2009.

International Search Report dated Dec. 2, 2009 for International Application No. PCT/US09/58848, filed Sep. 29, 2009.

* cited by examiner

ASYNCHRONOUS STREAMING OF DATA FOR VALIDATION

CROSS-REFERENCES TO RELATED APPLICATIONS

The present invention is related to U.S. application Ser. No. 12/240,907, filed Sep. 29, 2008, entitled "ACTOR-MOUNTED MOTION CAPTURE CAMERA", to U.S. application Ser. No. 12/240,911, filed Sep. 29, 2008, entitled "MOUNTING AND BRACKET FOR AN ACTOR-MOUNTED MOTION CAPTURE CAMERA SYSTEM", and to U.S. application Ser. No. 12/240,655, filed Sep. 29, 2008, entitled "METHODS AND APPARATUS FOR DOT MARKER MATCHING". These applications are incorporated by reference, for all purposes.

BACKGROUND OF THE INVENTION

The present invention relates to computer capture of object motion. More specifically, embodiments of the present invention relate to capturing of facial movement or performance of an actor.

Traditional computer animation of objects is determined by users known as animators. These animators are skilled artists who would specify movement of objects, such as people, within a computer environment. As a model for human movement, many animators often referred to how they moved, through the use of mirrors, video cameras, or the like.

Animation has also been based more directly upon physical movement of actors. This animation is known in the film industry as motion-capture or performance capture. In such cases, an actor is equipped with a suit with a number of markers, and as the actor moves, a number of cameras track the positions of the markers in space. This technique allows the actor's movements and expressions to be captured, and the movements and expressions can then be manipulated in a digital environment to produce whatever animation is desired.

One difficulty with prior motion capture techniques is that they often fail to produce high quality results with respect to capturing facial motion. Facial motion is very detailed and capturing the fine movements of an actor, or failing to do so, has a significant impact on the end product. Simply scaling current techniques to capture more markers is not practical as the data management, storage and processing capabilities are barely able to handle current marker density. High fidelity motion-capture, particularly video based data of the face, generates large volumes of digital data. Further, the fine-grain motion of the face is often lost in the noise inherent in stationary camera motion capture systems.

One solution to this problem has been to use separate and non-simultaneous face and body motion capture. A drawback to this approach is that it requires substantial duplication of effort by the actor and the crew, as each scene must be performed and captured at least twice. Another difficulty arises in that the actor's second performance may not correspond closely enough with the first, which affects the appearance and quality of the end result by making the correlation of the data from the multiple performances difficult.

Another solution is a simultaneous face and body motion capture using fixed position cameras and/or movable platform mounted cameras 100, such as is shown in FIG. 1. Capturing detailed facial motion generally involves tracking a large number of markers 140 placed on the actors' faces throughout a fixed capture volume 120, which is defined by the stationary motion capture cameras. In addition to the facial markers 140, markers 130 are placed on the actors' bodies, averaging a total of about 250 marker points per actor. For a scene with several actors, the total number of markers may be well over a thousand.

This abundance of markers creates a correspondingly large amount of data to be processed. It is sometimes difficult to accurately identify the markers associated with each actor 110 in a scene and obtaining sufficient resolution of the closely spaced facial markers 140 presents further complexities. In addition, because data from both the face and the body is captured together, it is necessary to process all of the data in order to determine whether sufficient facial motion data was recorded. Similarly, feedback cannot be given to the director or actor regarding the overall movement in the scene until all of the data has been processed. Waiting for the combined facial and body data to be processed significantly increases the delay between the initial capture and any reshoots that are necessary, likely causing production and scheduling problems, as well as increasing costs.

Prior head-mounted cameras have had several obstacles, such as interfering with the performance of the actor, either due to the discomfort of wearing the device or from the mere presence of the device in front of the actor's eyes or mouth, or failing to capture images of an adequate portion of the face for quality reconstruction. In addition, prior head-mounted cameras experience difficulty in maintaining position or in repositioning the camera. Other drawbacks to previous solutions include limitations on the actors' movements due to tethers or hard-wiring of a motion capture camera, as well as requiring operational intervention by the actor wearing the device.

Accordingly, an improved system for capturing and processing facial motions of an actor that increases accuracy while minimizing processing time and difficulty is desired. In addition, it would be desirable to provide a process for confirming that usable data is being acquired and recorded during the acquisition.

BRIEF SUMMARY OF THE INVENTION

The present invention relates to computer capture of object motion. More specifically, embodiments of the present invention relate to capturing of facial movement or performance of an actor. Embodiments of the present invention provide a head-mounted camera system that allows the movements of an actor's face to be captured separately from, but simultaneously with, the movements of the actor's body. In some embodiments of the present invention, a method of motion capture of an actor's performance is provided. A self-contained system is provided for recording the data, which is free of tethers or other hard-wiring, is remotely operated by a motion-capture team, without any intervention by the actor wearing the device. Embodiments of the present invention also provide a method of validating that usable data is being acquired and recorded by the remote system.

In a first aspect, embodiments of the present invention provide a method of motion capture animation of an actor's performance. The method includes placing body markers on the actor's body and facial markers on the actor's face. A head-mounted motion capture camera system is positioned on the actor's head. Body image data corresponding to the body markers is acquired during the actor's performance. At substantially the same time, facial image data corresponding to the facial markers during the actor's performance is acquired with the head-mounted motion capture camera system. The body image data is stored on a server, while the facial image data is stored on a data logger, where the facial image data comprises camera images of the actor's face. A camera image of the actor's face is selected and transmitted to a wireless receiver. The camera image is then reviewed at a remote workstation.

In some embodiments, the head-mounted motion capture camera system comprises at least two cameras. In many embodiments, the head-mounted motion capture camera system comprises at least four cameras. The head-mounted motion capture camera system may be configured to acquire image data from at least two views of each side of the actor's face.

In some embodiments, the step of transmitting the camera image to a wireless receiver uses a protocol selected from at least one of: Bluetooth, Zigbee, WiFi, WiMax and IR.

In some embodiments, the step of reviewing the camera image also includes validating the facial image data stored on the data logger.

In some embodiments, the method also includes transmitting the facial image data from the data logger to the server, which may use a USB or FireWire connection.

In many embodiments, the method also includes processing the body image data and generating an initial viewing sequence from the processed body image data. The initial viewing sequence is then transmitted to a display. The facial image data is also processed, the processed facial image data and the processed body image data are combined to generate animated images.

In another aspect, embodiments of the present invention provide a method of asynchronous streaming of data for validation. The method includes positioning a plurality of cameras each at one of a plurality of angles and acquiring image data with the plurality of cameras. The image data is stored locally on a data logger. A camera image is selected from the image data and wirelessly transmitted from the data logger to a receiver, where the receiver is coupled to a processor and a display. The camera image is displayed for review to validate that the image data has been acquired and stored. The image data is then transferred from the data logger to a server.

In some embodiments, the plurality of cameras are mounted on a head-mounted camera system, where the head-mounted camera system is positioned on an actor's head and the plurality of cameras are configured to capture images of the actor's face. In some embodiments, the plurality of cameras includes at least two cameras. In many embodiments, the plurality of cameras includes at least four cameras. The at least four cameras may be configured to acquire image data from at least two views of each side of the actor's face.

In some embodiments, the steps of selecting a camera image, wirelessly transmitting the camera image, and displaying the camera image are repeated sequentially at intervals throughout a period of time while the steps of acquiring image data and storing the image data are ongoing. As the step of selecting a camera image is repeated, an image is selected from a different camera during each sequential cycle.

In a further aspect, embodiments of the present invention provide a method of asynchronous streaming of image data for validation. The method includes positioning a head-mounted motion capture camera system on an actor's head, where marker dots have been placed on the actor's face. Image data is continuously acquired with the head-mounted motion capture camera system at an acquisition speed over an acquisition period. The image data includes marker data and is stored locally on a data logger. Camera images are selected from the image data at successive intervals during the acquisition period. Each of the camera images is wirelessly transmitted as it is selected from the data logger to a receiver, where the receiver is coupled to a processor and a display. Each of the camera images is displayed for review to validate that the image data is being acquired and stored. The image data is then transmitted from the data logger to a server at the end of the acquisition period.

In many embodiments, the head-mounted motion capture camera system includes at least four cameras. The head-mounted motion capture camera system may be configured to acquire image data from at least two views of each side of the actor's face.

DETAILED DESCRIPTION OF THE INVENTION

Embodiments of the present invention relate to computer capture of object motion. Although embodiments make specific reference to capturing of facial movement or performance of an actor, the system methods and device described herein may be applicable to any application in which computer capture of fine movements is required.

Figure 2:
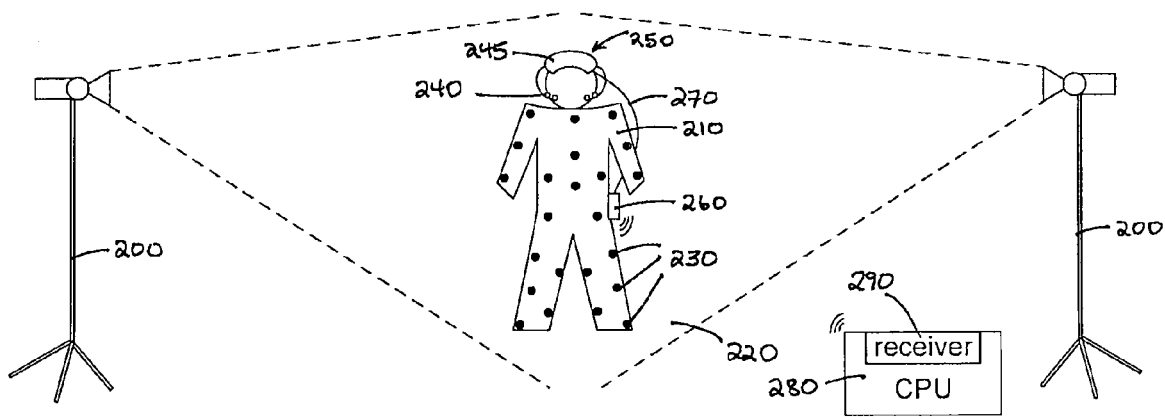
FIG. 2 shows a motion capture camera system according to an embodiment of the present invention.

FIG. 2 shows a motion capture camera system according to an embodiment of the present invention. A head-mounted motion capture camera system 250 is positioned on the actor's head for capturing data from the facial movement of the actor 210. The head-mounted camera system includes cameras 240 and a helmet 245. The cameras 240 are connected via cable 270 to a data logger 260, which is attached to the actor. The data logger 260 may be worn on a belt or otherwise as part of the actor's clothing to prevent the data logger from becoming disconnected during the actor's performance. The data logger 260 is in wireless communication with a processor 280 via a wireless receiver 290.

Figure 1:
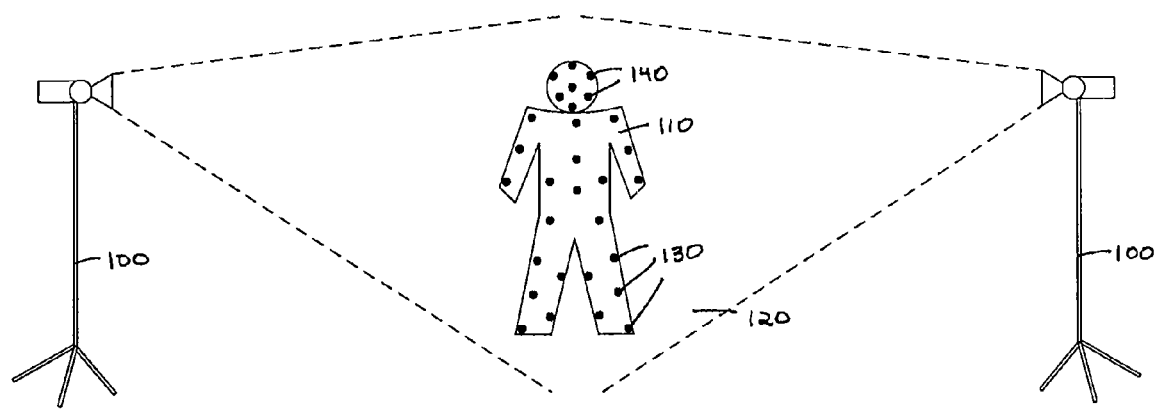
FIG. 1 depicts a prior art motion capture camera system.

For capturing the data from the body movement of an actor 210, the system in FIG. 2 is similar to that shown in FIG. 1. Fixed or platform-mounted movable cameras 200 are positioned around an actor 210, defining a capture volume 220. The cameras 200 capture images of the actor's movement using body markers 230.

Figure 3:
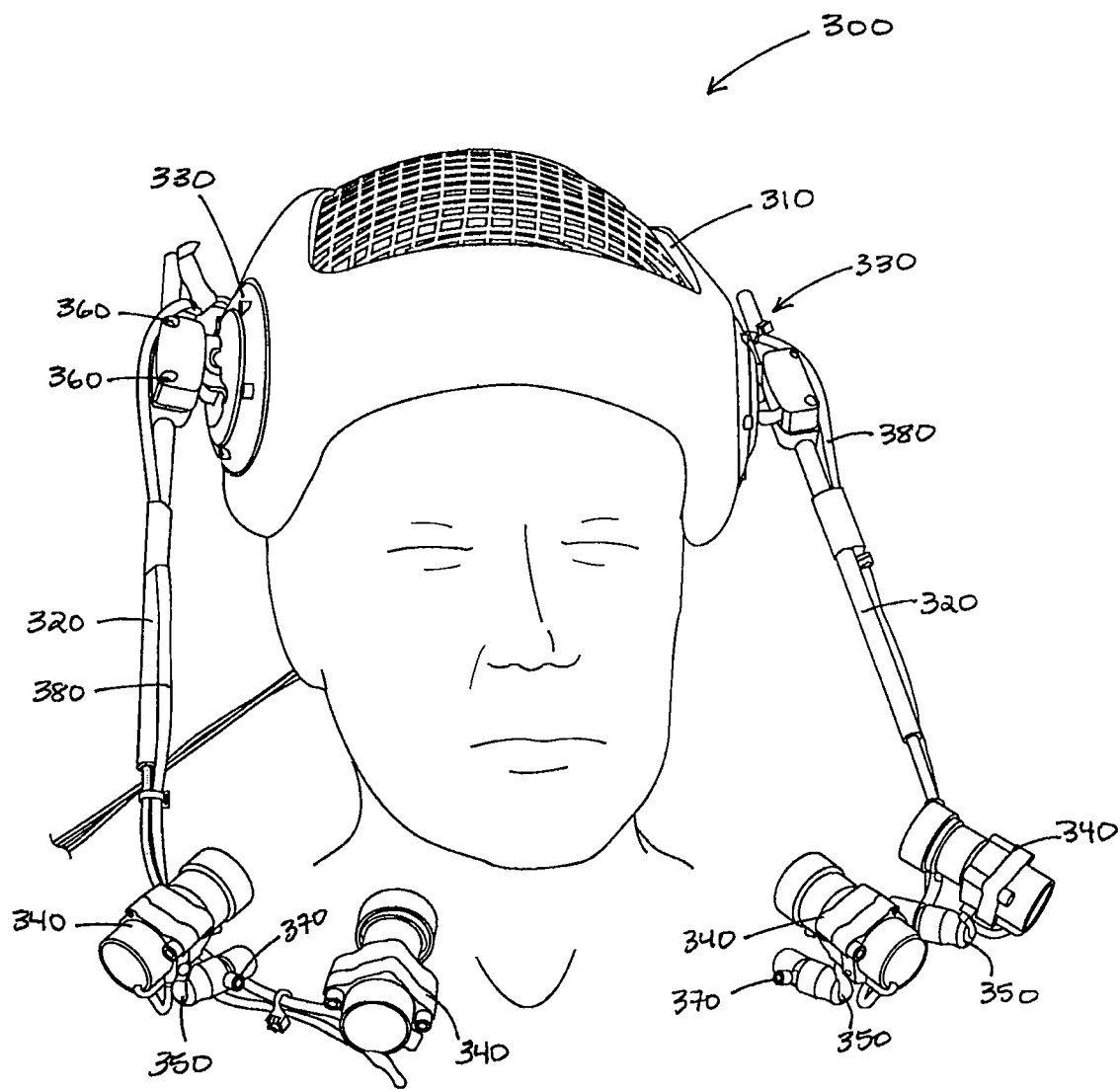
FIG. 3 shows a head-mounted camera system according to an embodiment of the present invention.

FIG. 3 shows one embodiment of a head-mounted motion capture camera system 300 in more detail. A helmet 310 is secured to the head of an actor. Mounting rods 320 are attached to the helmet 310 via universal joints 330. In some embodiments, the mounting rods 320 will be attached to the helmet 310 approximately above the temples of the actor. Mounted on the mounting rods 320 are cameras 340. The cameras 340 are secured to the mounting rods 320 with universally pivoting ball joints 350. The mounting rods 320 are preferably made from carbon fiber tubes and/or stainless steel to minimize weight, while maintaining the strength of the rods. Adjustment screws 360 and 370 are provided to adjust the orientation of the mounting rod 320 and cameras 340, respectively. The cameras 340 are connected via cables 380 to the data logger (not shown).

Figure 4:
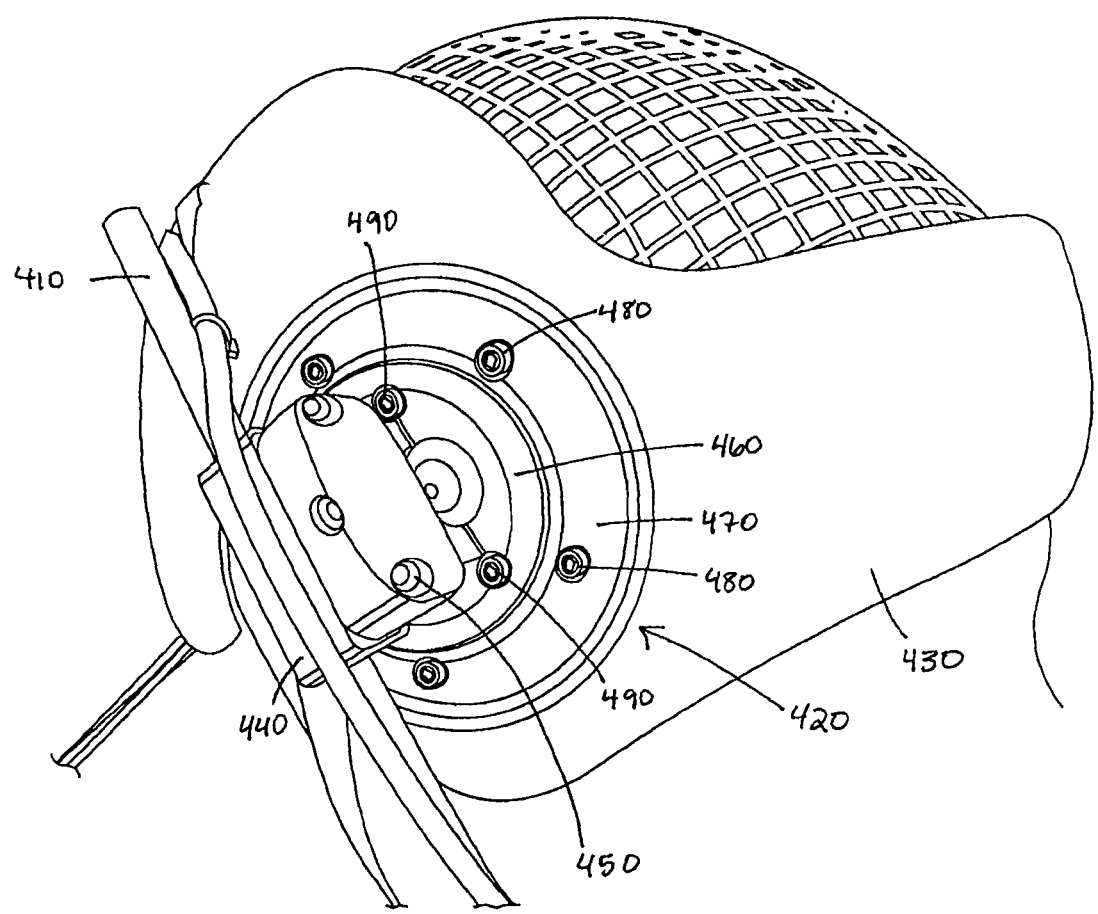
FIG. 4 depicts an enlarged view of a universal joint connecting a mounting rod and helmet.

In FIG. 4, an enlarged side view of an embodiment of a head-mounted motion capture camera system is shown. Mounting rod 410 is connected via a universal joint 420 to helmet 430. The universal joint includes a bracket 440, which holds the mounting rod 410 in a channel extending lengthwise through the bracket. Set screws 450 maintain pressure on the mounting rod 410 to hold it in position within the bracket 440. The bracket 440 is connected to an inner circular portion 460 of the universal joint 420. The inner circular portion 460 is positioned concentrically inside an outer circular portion 470. Outer circular portion 470 is affixed to the helmet 430 using screws 480. The outer circular portion 470 does not move with respect to the helmet and is preferably configured to affix to the helmet 430 in a singular orientation. Inner circular portion 460 is rotatable with respect to the outer circular portion 470, allowing one degree of freedom of movement for the mounting rod, such that its orientation may be adjusted to position the cameras (not shown) higher or lower in front of the actor's face. Set screws 490 are used to lock the inner circular portion 460 into a fixed position with respect to the outer circular portion 470.

Figure 5:
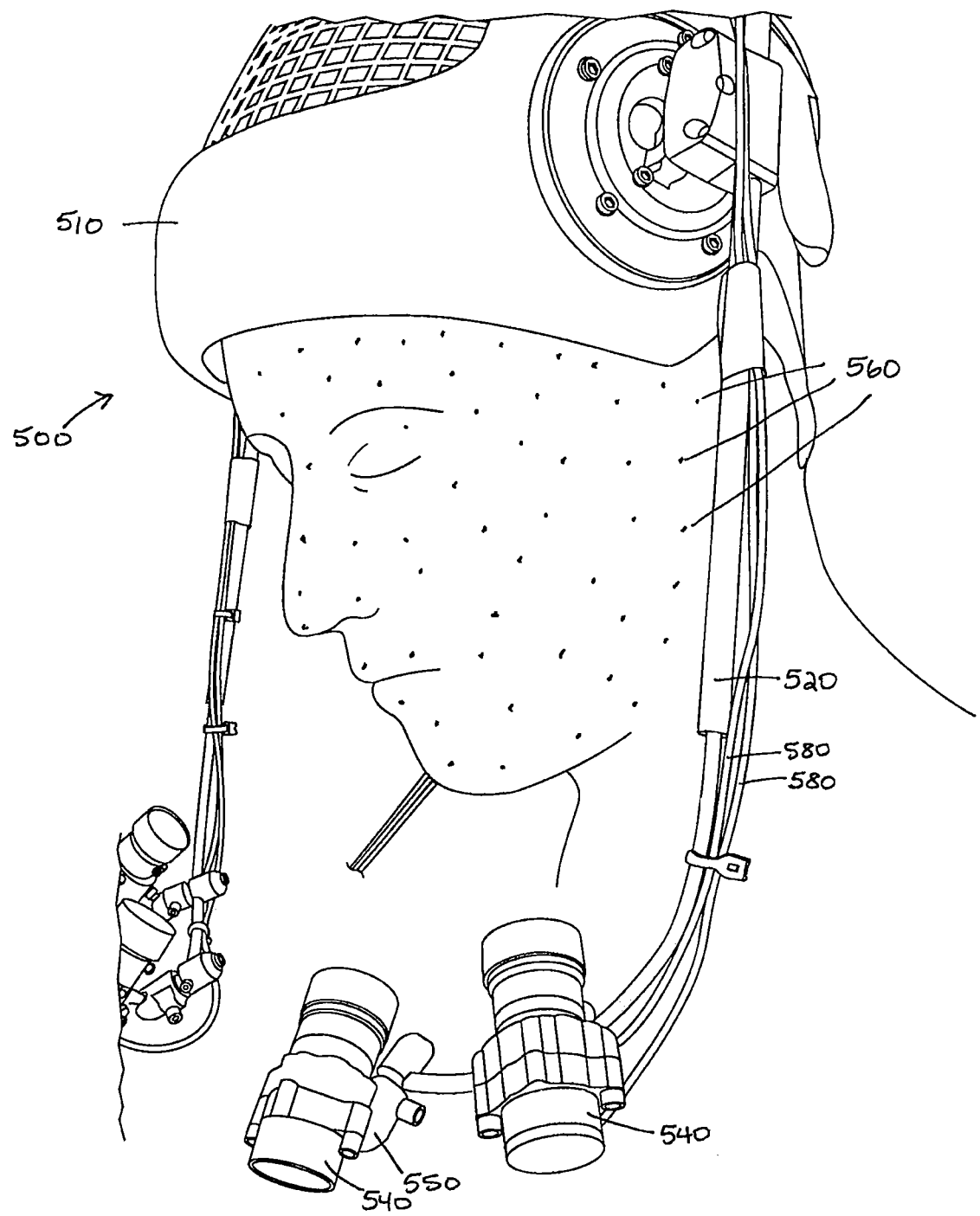
FIG. 5 shows a side view of an embodiment of a head-mounted motion capture camera system.

A side view of an embodiment of a head-mounted motion capture camera system 500 is shown in FIG. 5. Approximately 75 makeup dots 560 will be placed on the face of the actor. The makeup dots are not reflective and so are not captured by the fixed motion capture cameras described above (e.g. 100 in FIG. 1). Additionally, unlike the reflective markers used for tracking the body movements, the makeup dots are simple paint that can remain in place for an entire day, without needing to be replaced or repositioned. Cameras 540 are positioned on mounting rods 520. In a preferred embodiment, the camera system 500 has two mounting rods 520 and each mounting rod has two cameras 540 and the cameras 540 are machine vision micro-cameras. The cameras 540 record grayscale images of the actor's face, which are then used to track the movement of the face during post-processing.

The placement of the four cameras around the face allow for stereo reconstruction from both sides of the face because each side of the face is imaged from two different angles. In addition, the cameras move with the actor, keeping the relative position of each camera to the face the same, which minimizes the calculations necessary to identify and track the makeup dots 560 and to process the image data.

Figure 6:
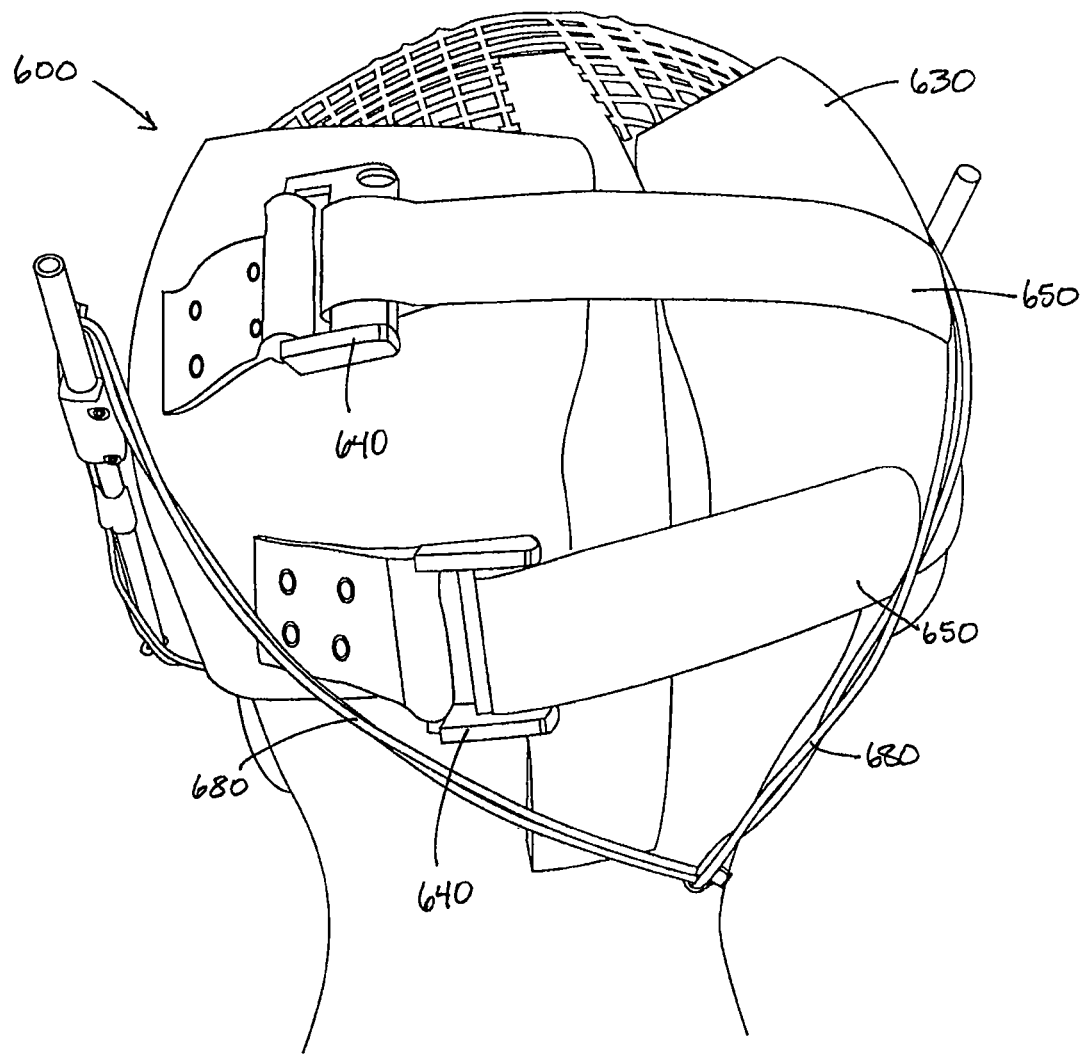
FIG. 6 shows a rear view of the head-mounted motion capture camera system.

FIG. 6 shows a view of the back of the head-mounted motion capture camera system 600. The helmet 630 may be secured to the head of the actor, for example by using buckles 640 with a hook-and-loop fastening material 650, a chin strap (not shown), or a pressurized custom fit. In a preferred embodiment, cables 680 are gathered at the back of the actor's head and then connected to the data logger (not shown) in order to minimize the chances of the actor becoming entangled by the cables or the cables becoming disconnected.

Figure 7A:
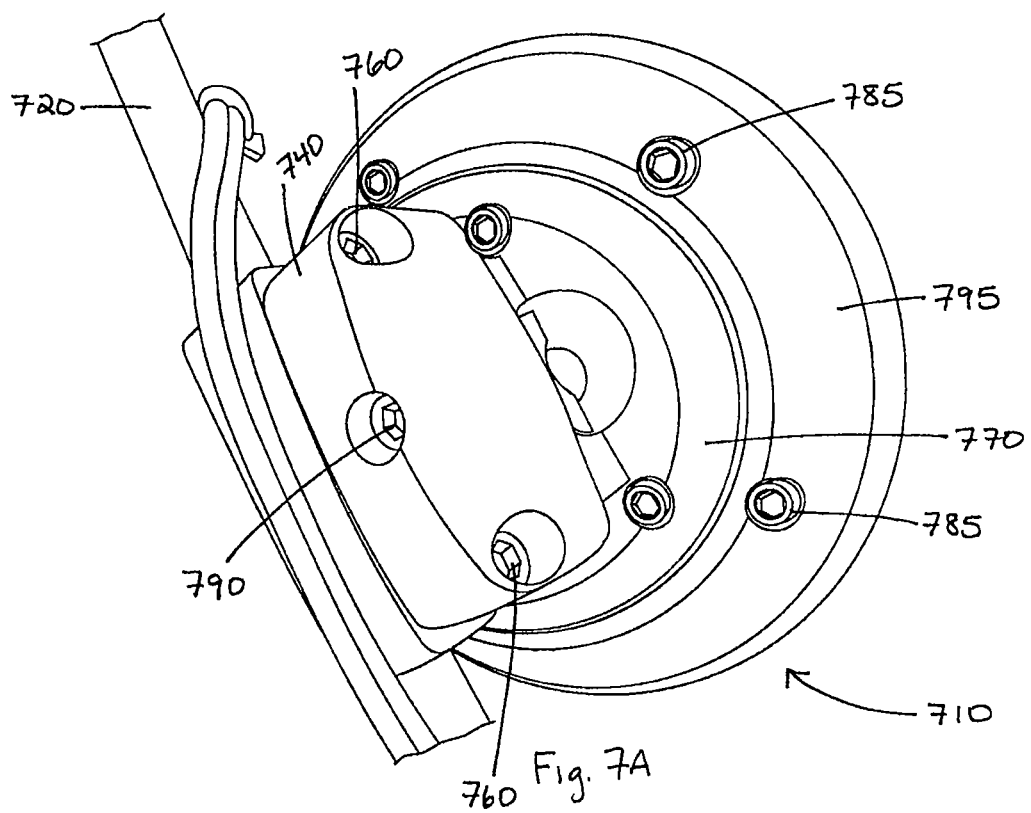
FIGS. 7A and 7B show enlarged views of a universal joint.
Figure 7B:
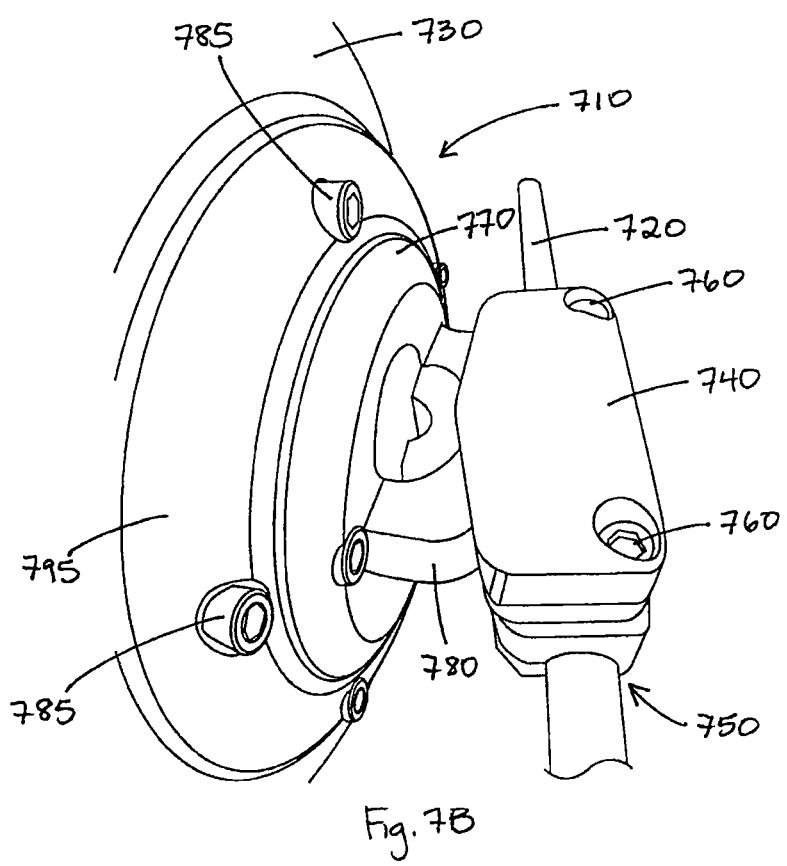
Figure 8A:
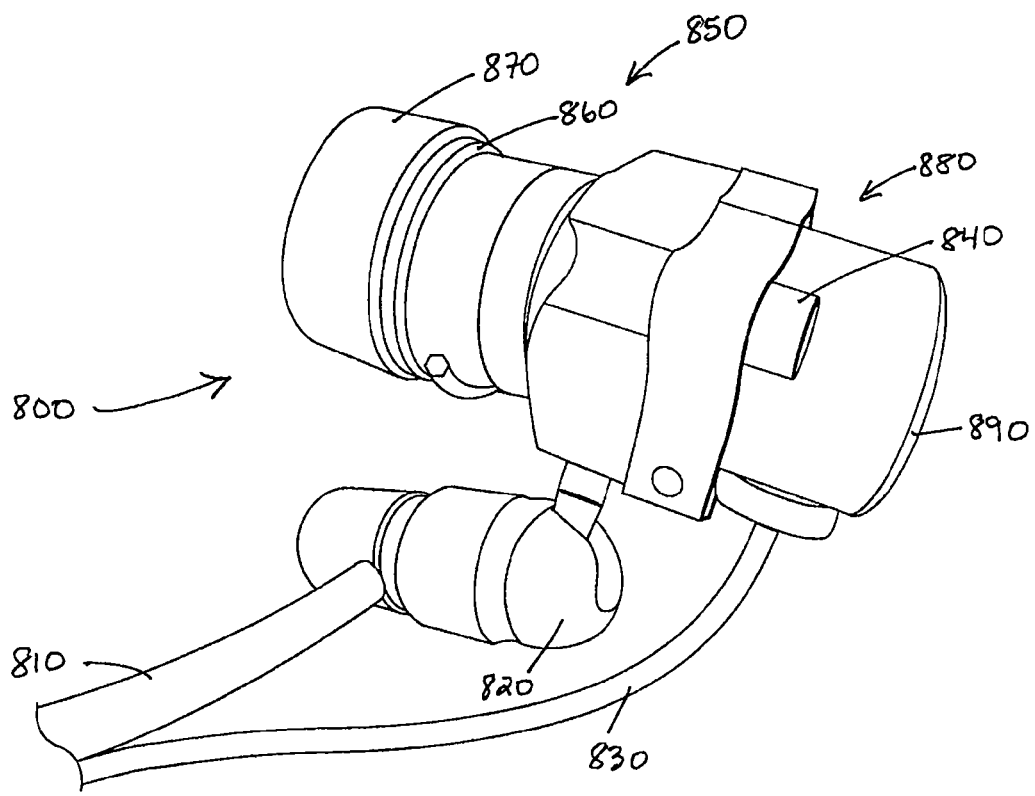
FIGS. 8A-8D show enlarged views of a camera and universally pivoting ball joint according to an embodiment of the invention.
Figure 8B:
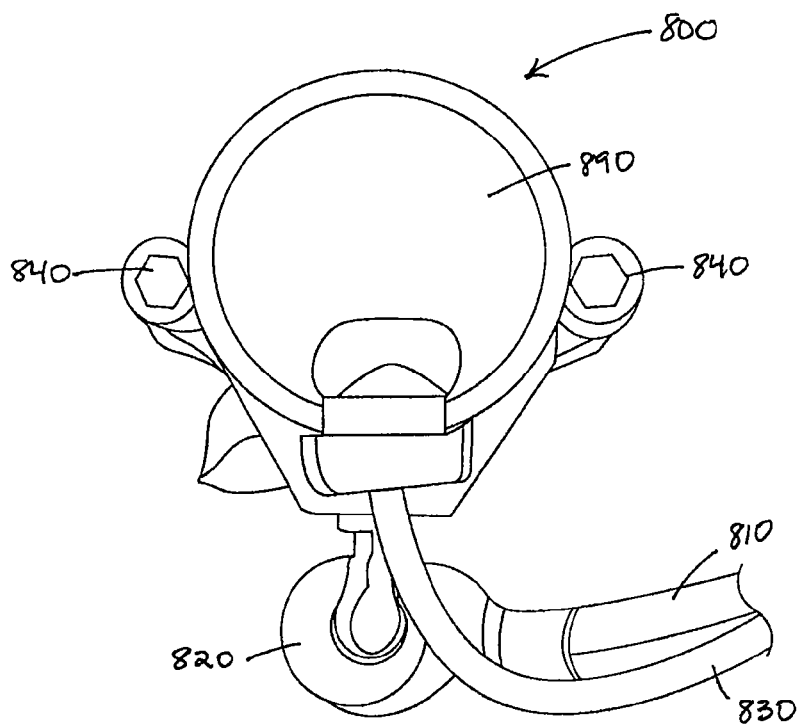
Figure 8C:
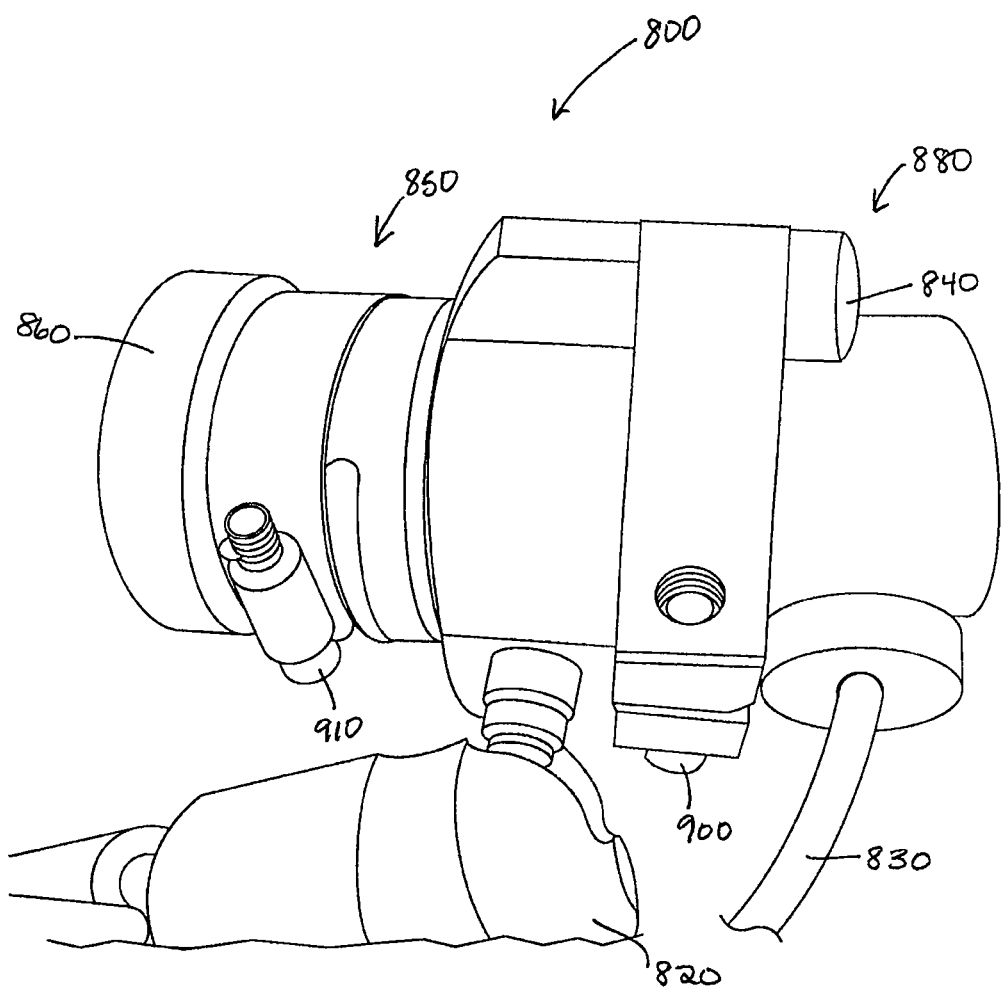
Figure 8D:
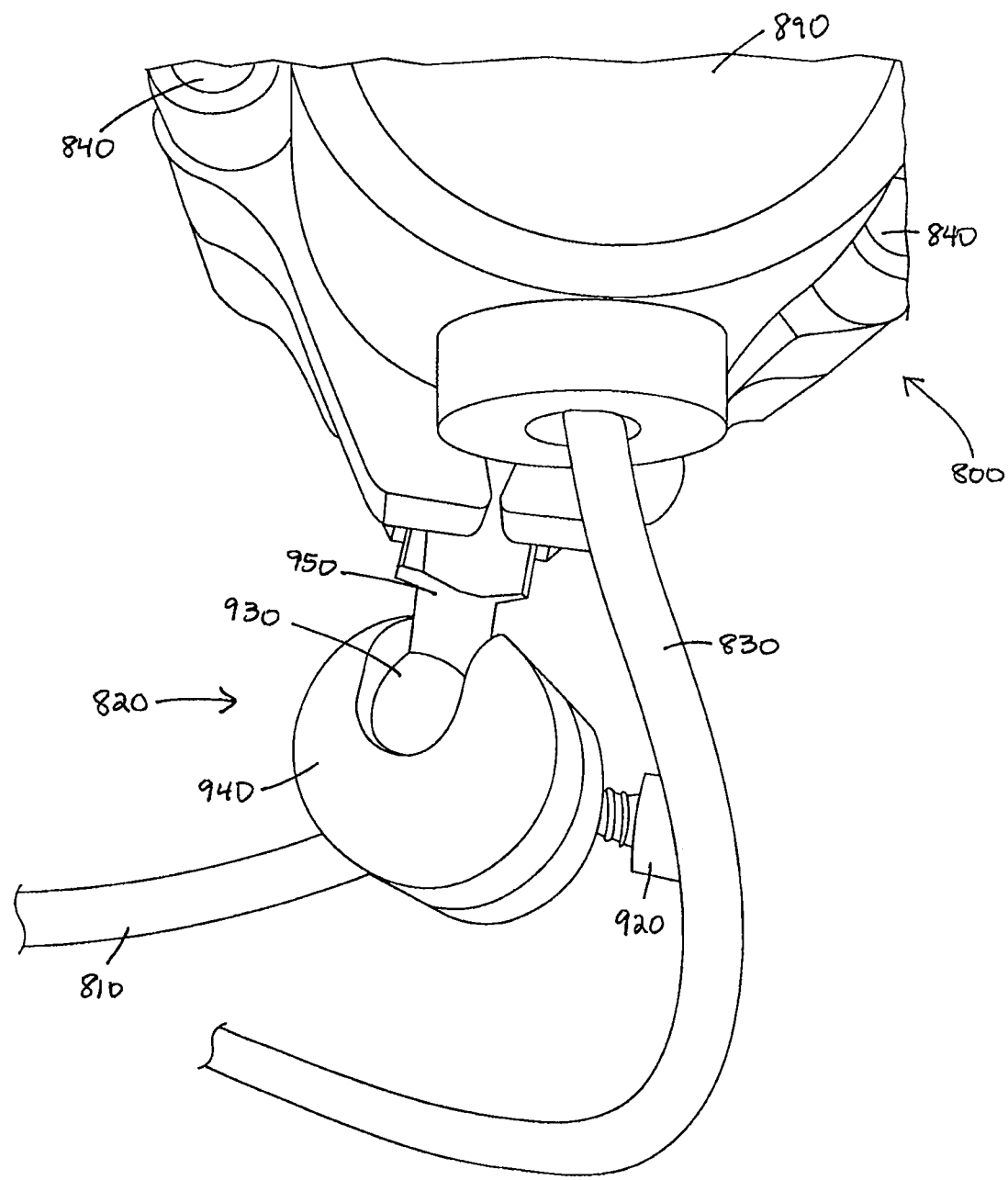

FIGS. 7A and 7B show additional views of an embodiment of the universal joint 710 that connects the mounting rod 720 to the helmet 730. Bracket 740 holds the mounting rod 720 in a channel 750 that runs through the length of the bracket. By loosening set screws 760, mounting rod 720 may be rotated around its axis and may be repositioned within the channel 750 to extend a greater or shorter distance from the bracket 740. The bracket 740 is attached to the inner circular portion 770 with connector 780, and the bracket may pivot on the connector to adjust the mounting rod 720 to be closer to or further from the actor's face. A set screw 790 is used to secure the bracket 740 in position with the connector 780.

The universal joint 710 provides a connection for the mounting rod that is both easily repositioned by simply loosening the appropriate set screws, and securely held in a fixed position when the set screws are tightened. When necessary, one of the mounting rods 720 may be removed from the helmet 730 by loosening screws 785 to remove the entire assembly from the helmet. This can be useful in scenes where an actor is required to hold an object near one side of his face, for example, or when he is required to rest his head on a surface, such as a pillow. After that portion of the performance has been captured, the mounting rod 720 and universal joint 710 assembly can be replaced in exactly the same position and orientation as it was previously arranged by reattaching the set screws 785. Because the outer circular portion 795 does not move with respect to the helmet 730, as discussed above, when it is placed on the helmet again with the screws, it will adopt its original orientation.

In FIGS. 8A-8D, enlarged views of a camera and universally pivoting ball joint according to an embodiment of the invention are shown. Camera 800 is attached to mounting rod 810 via a universally pivoting ball joint 820. The universally pivoting ball joint 820 comprises a ball 930 that fits inside a socket 940, which allows the camera to be oriented in a wide range of directions. The ball 930 of the ball joint 820 is connected via a stem 950 to the housing of the camera 800, while the socket 940 is connected to the mounting rod 810. Once an orientation is selected for the camera, based on the requirements of the actor's face or other considerations, the ball 930 may be locked into that position in the socket 940 using set screw 920.

Set screws 900 hold the camera 800 in place on the stem 950 of the universally pivoting ball joint 820. The camera 800 may be removed, for example to replace a defective or non-functioning camera, by simply loosening the set screws 900. It is not necessary to adjust the ball joint 820 or the mounting rod 810 to remove the camera, thus when a camera 800 (either the same or a different camera) is placed onto the ball joint 820, it will be in the same position and orientation as the original camera. Similarly, set screws 910 hold the lens 860 in place and allow it to be removed and replaced without changing its position or orientation.

This consistency, along with the consistent positioning of the mounting rod as discussed above, is exceptionally helpful in minimizing the computational requirements for processing the image data. Processing can be performed using techniques described in co-pending U.S. patent application Ser. No. 12/240,655 (filed Sep. 29, 2008, entitled "Methods and apparatus for dot marker matching"). The tolerance for maintaining the positions of each of the elements is to within portions of a millimeter. It is important to maintain the position and orientation of the cameras and mounting rods in order to keep the angle of view of the face from each camera the same, as well as to keep the angles between each of the cameras constant. Because the cameras remain in a known, fixed position, even after a replacement, it is easier to identify and correlate the makeup dots on the actor's face, and thus to process the images for the animation. Further, because the cameras are fixed relative to the face, they have a much higher effective resolution, yielding a better signal to noise ratio.

Also in FIGS. 8A-8D, cable 830 is shown connecting the camera 800 to the data logger (not shown). A front portion 850 of the camera 800 comprises a lens 860, which may be covered by a lens cap 870 for protection when not in use. Screws 840 secure the front portion 850 to the rear portion 880 of camera 800. In some embodiments, the camera 800 comprises a charge-coupled device ("CCD") element. The CCD element (not shown) is permanently secured within the rear portion 880 by a resin 890.

Advantages of the present invention include both the data processing aspects and the performance aspects of motion capture technology. The head-mounted camera system of the present invention captures images that show much greater detail about the movement of the face, which provides a greater effective resolution of the face for use in creating the final animation product. This greater detail is achieved in part because the cameras are able to maintain a close view of the face at all times, even when an actor's face would otherwise be blocked from view if using only the fixed cameras. The greater detail is also due in part to the larger number of markers that may be captured using the head-mounted camera system, versus the number that can be captured with previous systems. Further, because the time needed to process the body image data is no longer tied to processing the facial image data, it is possible to capture more data than in previous systems. As discussed in more detail below with respect to FIGS. 9A-9D, only selected images of the face are viewed in near to real-time, the rest are stored and processed later. Thus, the frame rate for acquiring image data can be increased, improving resolution.

In addition, because the head-mounted camera system captures the facial image data at the same time as the body capture, the system has the artistic advantages of prior simultaneous capture solutions while using manageable data capture and processing requirements. For example, an actor need not attempt to duplicate his performance precisely for separate captures of the face and the body. In addition, the placement of the cameras at the sides of the face allow for a less obstructed line of sight for the actor, which is preferred by actors and contributes to their comfort in performing using motion capture equipment. The placement also allows unobstructed access to the actor's mouth, which is helpful, for example, in scenes where the actor is expected to eat or drink.

FIGS. 9A-9D show a method of motion capture animation and data validation according to an embodiment of the present invention. The method begins in FIG. 9A with step 1000, placing markers on an actor's face and body. A head-mounted camera system is positioned on the actor such that the cameras capture images of the actor's face in step 1010. The actor then performs in step 1020 and the performance is acquired by the motion capture system. In step 1030, external cameras capture image data corresponding to the markers on the body of the actor. At substantially the same time, the head-mounted camera system acquires two views of each side of the actor's face in step 1050. As discussed above, the facial image data acquired includes marker data.

In step 1040, the body image data is stored on a server. Proceeding past reference point C, in step 1070 it is determined whether all of the scenes have been finished. If not, the actor continues to perform in step 1020 and the subsequent steps are repeated. If all of the scenes have been finished, the method continues at reference point D in FIG. 9C, which is discussed below.

Figure 9A:
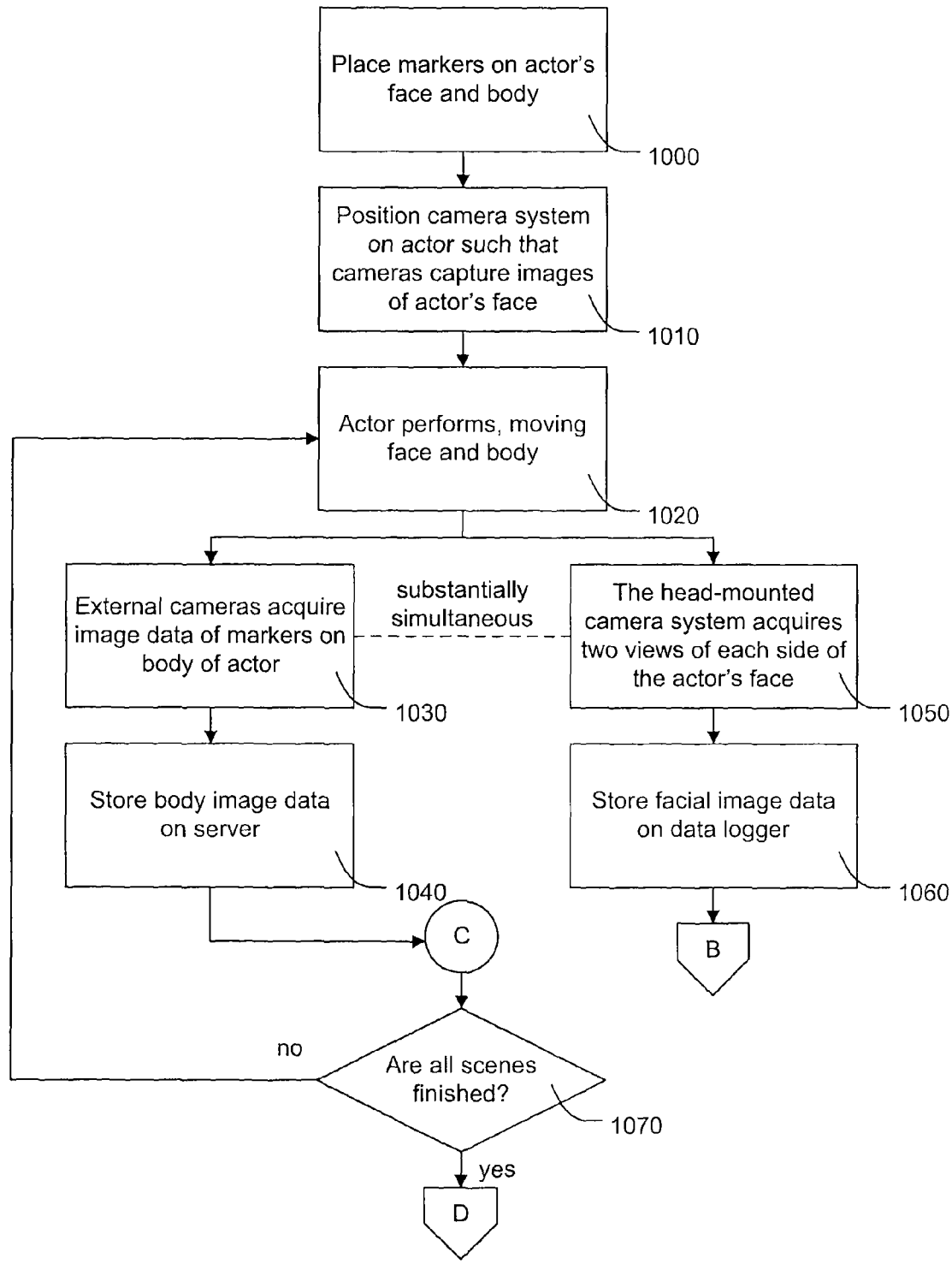
FIGS. 9A-9D show a method of motion capture animation and data validation according to an embodiment of the present invention.

Continuing in FIG. 9A, in step 1060 the facial image data is stored on the data logger. Moving to reference point B in FIG. 9B, a camera image is selected in step 1080. In step 1090, the selected camera image is transmitted to a wireless receiver that is connected to a remote workstation. The wireless transmission may use one of several known protocols, such as Bluetooth, Zigbee, WiFi, WiMax or IR. The transmission comprises a low resolution, lossy-compressed data stream that may be sub-sampled in time, width or height. The data stream may contain time code information, the total number of frames recorded by the data logger, the data logger's battery life and recording capacity remaining and other pertinent data.

In step 1100, the selected camera image and related data is then inspected by an operator or automatic computer software to verify that the cameras are acquiring and the data logger is storing usable data. The inventors of the present invention have sometimes discovered that after a full day of shooting, one or more cameras are defective and the image data has not been captured, that the cameras' lenses have become dirty because of oil, saliva, food or other obstructions, or that problems occurred with the data logger on the actor's back. This validation is an important step in the process because it ensures that these kinds of problems with the portable head-mounted camera system or with the acquired data are caught as quickly as possible, minimizing wasted time and effort by the actors, director and crew by reducing the need for retakes.

If the data on the data logger is determined to be valid in step 1110, then the method continues at reference point C in FIG. 9A. If the data is determined to be invalid for any reason, then the source of the problem is determined in step 1120. In step 1130, the problem is fixed, for example, by replacing a defective or damaged camera or by changing the batteries of the data logger. After the problem has been resolved, the method continues at reference point C in FIG. 9A.

Moving to reference point C in FIG. 9A, step 1070 determines whether all of the scenes are finished, as described above. After the scenes are finished, the method continues at reference point D in FIG. 9C. In step 1140, the data from the data logger is transmitted to the server. The transmission may be via a USB, FireWire or similar type of connection. At step 1150, both the facial image data and the body image data are stored on the server. The body image data is processed in step 1160 to generate an initial viewing sequence or "rough cut" for the director in step 1170. Because the body image data is processed alone, without the facial image data, the processing can be completed much faster. In addition, the body markers are easily identified for processing, in comparison with the identification of previous facial markers in a conventional motion capture system, such as shown in FIG. 1. Accordingly, because the body markers are more easily identified, they require less manual identification by an operator.

In step 1180, the director views the rough cut to determine whether any changes or reshoots are needed. If the director does not approve the rough cut in step 1200, then the process returns to reference point C to repeat the earlier steps of the method. If the rough cut was approved, then the body image data and the facial image data are combined in step 1210 to produce an animated image. After the animation is produced, the method continues at reference point E in FIG. 9D.

Figures 9B, 9D:
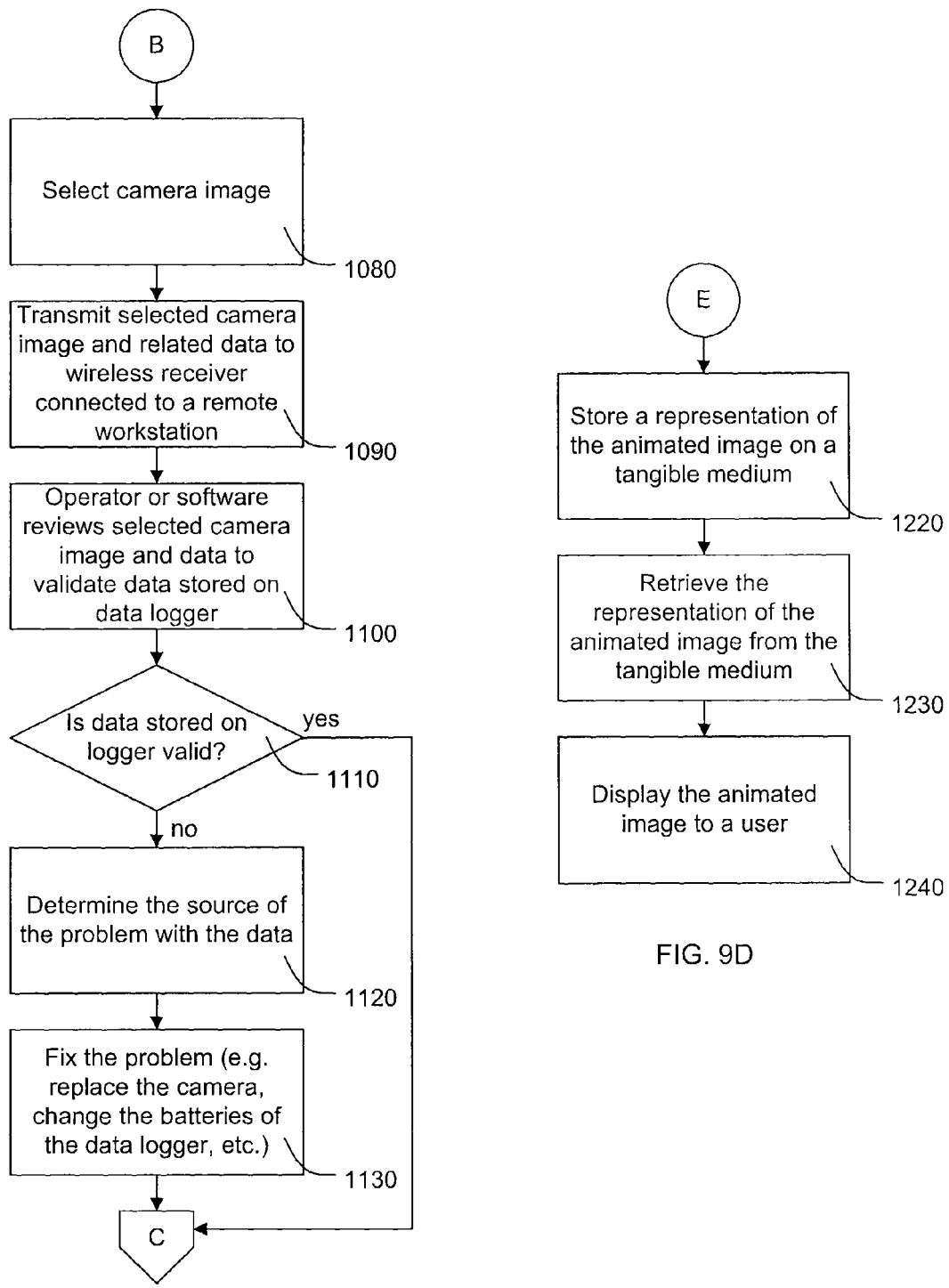
Figure 9C:
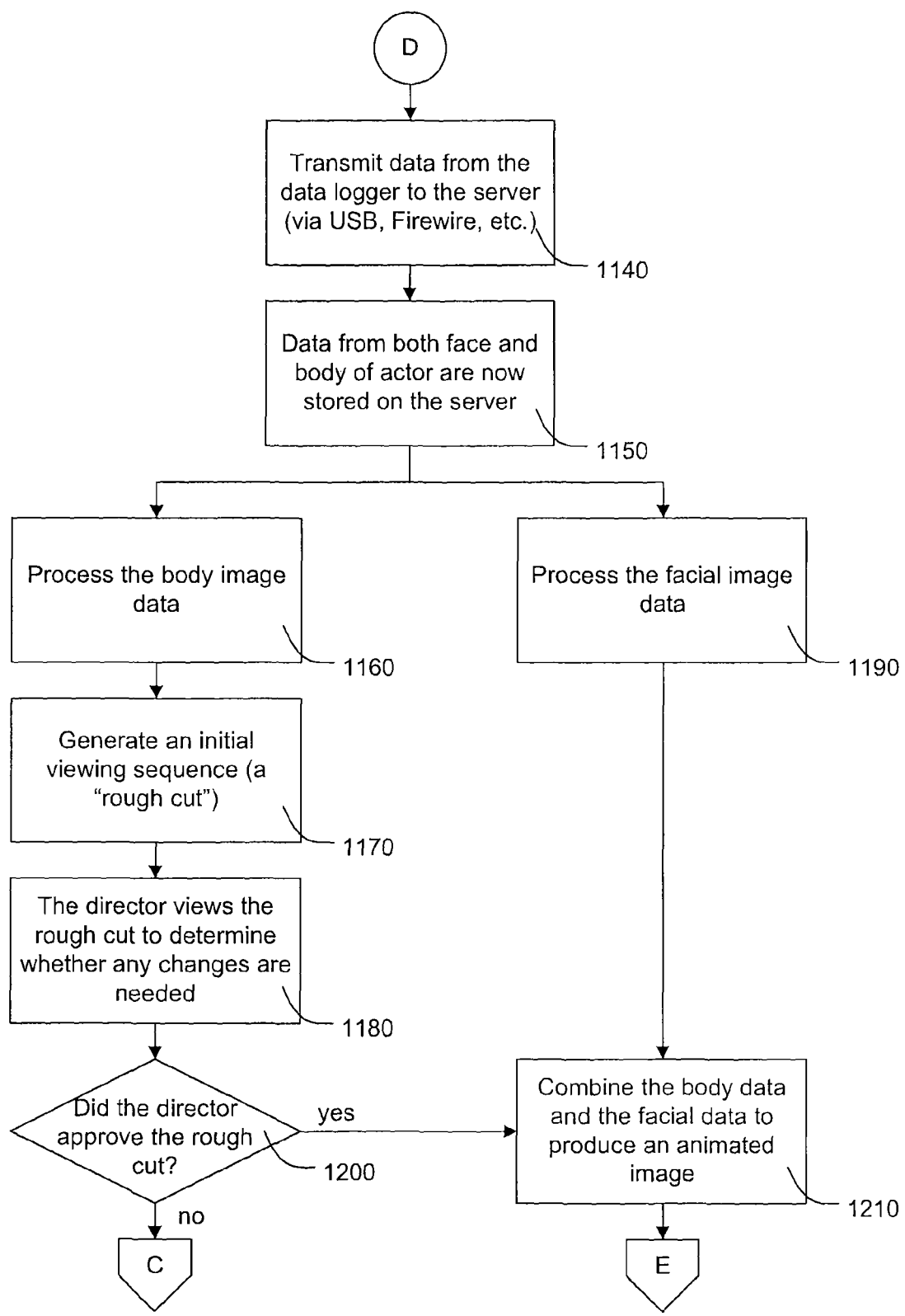

In step 1220 in FIG. 9D, a representation of the animated image is stored on a tangible medium. The representation is the retrieved from the tangible medium in step 1230 and displayed to a user in step 1240. The user may be the director, the studio executives, an audience at the theater, etc.

While the exemplary embodiments have been described in some detail, by way of example and for clarity of understanding, those of skill in the art will recognize that a variety of modifications, adaptations, and changes may be employed. Hence, the scope of the present invention should be limited solely by the appended claims.

What is claimed is:

1. A method of motion capture animation of an actor's performance comprising:

facilitating capturing of body motion and facial motion of the actor at substantially the same time, wherein the facilitating includes:
  placing a first number of body markers on the actor's body;
  placing a second number of makeup facial markers on the actor's face, wherein the second number of makeup facial markers captures facial motion of the actor's face with a higher resolution than the first number of body markers captures body motion of the actor's body;
  mounting a head-mounted motion capture camera system onto the actor's head;
  acquiring body image data corresponding to the body markers during the actor's performance with a first set of fixed motion capture cameras; and
  acquiring facial image data corresponding to the makeup facial markers during the actor's performance with the head-mounted motion capture camera system;
processing the captured body motion and facial motion separately, wherein the processing includes:
  storing the body image data on a server;
  storing the facial image data on a data logger, wherein the facial image data comprises camera images of the actor's face; and
validating whether usable facial image data is acquired by the head-mounted motion capture camera system and is stored on the data logger, wherein the validation includes:
  selecting camera images of the actor's face at intervals from the facial image data from the data logger, wherein the selected camera images are fewer in number than the stored camera images;
  transmitting a low resolution stream of the selected camera images to a wireless receiver, wherein the stream includes data associated with the state of the data logger; and
  validating whether the low resolution selected camera images are valid; and
if the selected camera images are determined to be valid, transmit the facial image data stored on the data logger to a server.

2. The method motion of capture animation of claim 1, wherein the head-mounted motion capture camera system comprises at least two cameras.

3. The method of motion capture animation of claim 1, wherein the head-mounted motion capture camera system comprises at least four cameras.

4. The method of motion capture animation of claim 3, wherein the head-mounted motion capture camera system is configured to acquire image data from at least two views of each side of the actor's face.

5. The method of motion capture animation of claim 1, wherein the step of transmitting the low resolution stream of the selected camera images to a wireless receiver uses a protocol selected from at least one of: Bluetooth, Zigbee, WiFi, WiMax and IR.

6. The method of motion capture animation of claim 1, wherein the step of transmitting the facial image data from the data logger to the server uses a USB or FireWire connection.

7. The method of motion capture animation of claim 1, wherein the processing further comprises:
  processing the body image data;
  generating an initial viewing sequence from the processed body image data;
  transmitting the initial viewing sequence to a display;
  processing the facial image data separately from the body image data; and
  combining the processed facial image data and the processed body image data to generate animated images.

8. The method of motion capture animation of claim 1, wherein the validation to determine that a low resolution selected camera image is valid comprises inspection by computer software.

9. The method of motion capture animation of claim 1, wherein data associated with the state of the data logger includes at least one of the total number of frames recorded, battery life, and the recording capacity remaining.

10. A method of asynchronous streaming of data for validation comprising:
  positioning a plurality of cameras each at one of a plurality of angles;
  acquiring image data of an actor's performance comprising body and facial image data with the plurality of cameras, wherein the body image data corresponds to a first number of body markers and the facial image data correspond to a second number of makeup facial markers, the second number of makeup facial marker facilitating capturing of the actor's performance in a higher resolution than the first number of body markers;
  storing the facial image data locally on a data logger;
  validating whether usable facial image data is acquired by the head-mounted motion capture camera system and is stored on the data logger, wherein the validation includes:
    selecting camera images of the actor's face at intervals from the facial image data from the data logger, wherein the selected camera images are fewer in number than the stored camera images;
    wirelessly transmitting a low resolution stream of the selected camera images on the data logger to a receiver, wherein the receiver is coupled to a processor and a display, wherein the stream includes data associated with the state of the data logger;
    displaying the low resolution versions of the selected camera images on the display for validation;
  based upon the validation, taking at least one remedial action; and
  transmitting the facial image data stored on the data logger the data logger to a server.

11. The method of asynchronous streaming of data for validation of claim 10, wherein at least some of the plurality of cameras are mounted on a head-mounted camera system, wherein the head-mounted camera system is positioned on an actor's head.

12. The method of asynchronous streaming of data for validation of claim 11, wherein at least some of the plurality of cameras are configured to capture images of the actor's face.

13. The method of asynchronous streaming of data for validation of claim 11, wherein the plurality of cameras comprises at least two cameras.

14. The method of asynchronous streaming of data for validation of claim 11, wherein the plurality of cameras comprises at least four cameras.

15. The method of asynchronous streaming of data for validation of claim 14, wherein the at least four cameras are configured to acquire image data from at least two views of each side of the actor's face.

16. The method of asynchronous streaming of data for validation of claim 10, wherein the sequentially repeated step of selecting the camera images of the actor's face comprises selecting an image from a different one of each of the plurality of cameras during each sequential cycle.

17. A method of asynchronous streaming of image data for validation comprising:
- positioning a head-mounted motion capture camera system on an actor's head, wherein makeup marker dots have been placed on the actor's face;
- continuously acquiring image data with the head-mounted motion capture camera system of an actor's performance comprising facial image data at an acquisition speed over an acquisition period, wherein the facial image data includes makeup marker data;
- storing the facial image data locally on a data logger;
- validating whether usable facial image data is acquired by the head-mounted motion capture camera system and is stored on the data logger, wherein the validation includes:
  - selecting camera images of the actor's face from the facial image data at successive intervals during the acquisition period, wherein the selected camera images are fewer in number than the stored camera images;
  - wirelessly transmitting a low resolution stream of each of the selected camera images of the actor's face as it is selected from the data logger to a receiver, wherein the stream includes data associated with the state of the data logger, wherein the receiver is coupled to a processor and a display; and
  - displaying the low resolution versions of each of the selected camera images on the display for validation, wherein validation to determine that a low resolution selected camera image is valid comprises verifying the actor's face is captured in each of the selected camera images;
- if a low resolution selected camera image is verified to be valid, transmitting the facial image data stored on the data logger to a server at the end of the acquisition period and after the selected camera images are validated as having been acquired and stored; and
- if the low resolution selected camera image is verified to be invalid, transmitting the facial image data stored on the data logger to the server after a source of invalidity is determined wherein the steps of selecting the camera images of the actor's face, wirelessly transmitting the selected camera images, and displaying the selected camera images are repeated sequentially at intervals throughout the acquisition period while the steps of acquiring image data and storing the facial image data are ongoing.

18. The method of asynchronous streaming of image data for validation of claim 17, wherein the head-mounted motion capture camera system comprises at least four cameras.

19. The method of asynchronous streaming of image data for validation of claim 17, wherein the head-mounted motion capture camera system is configured to acquire image data from at least two views of each side of the actor's face.

* * * * *